United States Patent [19]
Ahlberg et al.

[11] Patent Number: 5,758,295
[45] Date of Patent: May 26, 1998

[54] UNIFORM MAN-MACHINE INTERFACE FOR CELLULAR MOBILE TELEPHONES

[75] Inventors: Björn Gustav Dinese Ahlberg, Falsterbo, Sweden; Anders Lennart Mölne, Cary, N.C.; Johan Falk, Järfälla, Sweden

[73] Assignee: Telefonaktiebolget LM Ericsson, Sweden

[21] Appl. No.: 777,002

[22] Filed: Jan. 3, 1997

Related U.S. Application Data

[63] Continuation of Ser. No. 213,704, Mar. 16, 1994, abandoned.

[51] Int. Cl.$^6$ .................................... H04Q 7/32
[52] U.S. Cl. .................. 455/566; 455/550; 379/396
[58] Field of Search .............................. 379/425, 433, 379/396; 345/146, 169; 455/550, 566, 564, 575, 90, 552, 553

[56] References Cited

U.S. PATENT DOCUMENTS

| | | |
|---|---|---|
| 5,020,093 | 5/1991 | Pireh . |
| 5,127,042 | 6/1992 | Gillig et al. ................ 379/61 X |
| 5,128,981 | 7/1992 | Tsukamoto et al. ........... 455/450 |
| 5,335,355 | 8/1994 | Tanaka et al. . |
| 5,425,077 | 6/1995 | Tsoi .......................... 379/58 |
| 5,436,954 | 7/1995 | Nishiyama et al. ............ 379/58 |
| 5,509,048 | 4/1996 | Meidan et al. ................ 379/58 |
| 5,555,502 | 9/1996 | Opel ...................... 364/424.05 |
| 5,561,712 | 10/1996 | Nishihara ................... 379/355 |
| 5,579,535 | 11/1996 | Orlen et al. ................. 455/421 |
| 5,581,593 | 12/1996 | Engelke et al. .............. 455/31.2 |

FOREIGN PATENT DOCUMENTS

| | | |
|---|---|---|
| 2046423 | 1/1992 | Canada . |
| 0279233 | 8/1988 | European Pat. Off. . |
| 2268362 | 1/1994 | United Kingdom . |
| 92/14331 | 8/1992 | WIPO . |
| 95/23485 | 8/1995 | WIPO . |

OTHER PUBLICATIONS

Telcom Report, vol. 16, No. 6, Nov. 1993, "GSM Handy Mit Top Handling", pp. 332–335.

Electrical Communication, No. 4, 1993, New Intuitive Screenphones for Advance Telephony Services, pp. 380–386.

Annual Review of Communications International Engineering Consortium, vol. 47, 1993/94, "User Interface Issues For Cellular Phones", pp. 679–685.

*Primary Examiner*—Dwayne Bost
*Assistant Examiner*—William G. Trost
*Attorney, Agent, or Firm*—Burns, Doane, Swecker & Mathis, LLP

[57] ABSTRACT

A mobile radio terminal includes a display for outputting at least one menu. The menu includes at least one branch for processing telephone calls. Each of the branches includes at least one option for choosing a corresponding action to be performed by the radio terminal, the corresponding actions including causing a successive branch to be displayed and performing a terminal function. The mobile terminal includes a selection mechanism for designating one of the options. A first key is included for confirming selection of the option designated by the selection means, so as to move forward through the menu to a succeeding branch and perform the corresponding action chosen by the confirmed option, and for originating and answering telephone calls. A second key is included for rejecting selection of the option designated by the selection mechanism, so as to move backward through the menu to a preceding branch, and for terminating telephone calls.

13 Claims, 15 Drawing Sheets

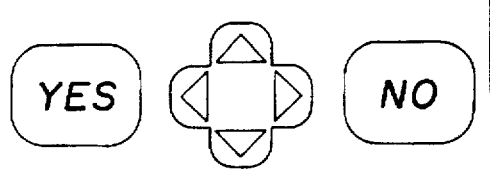
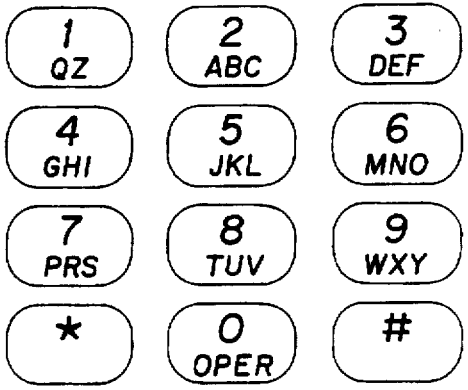
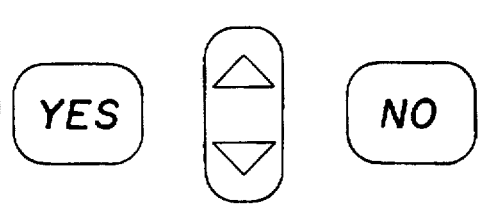
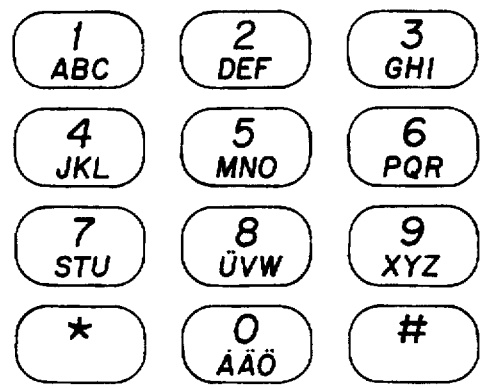
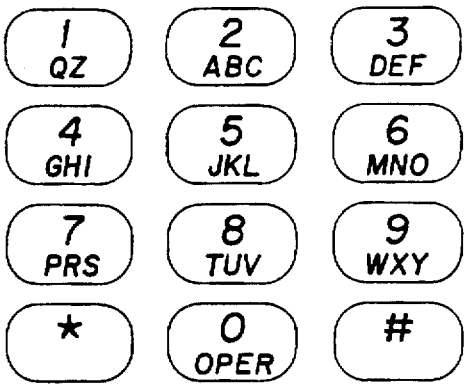

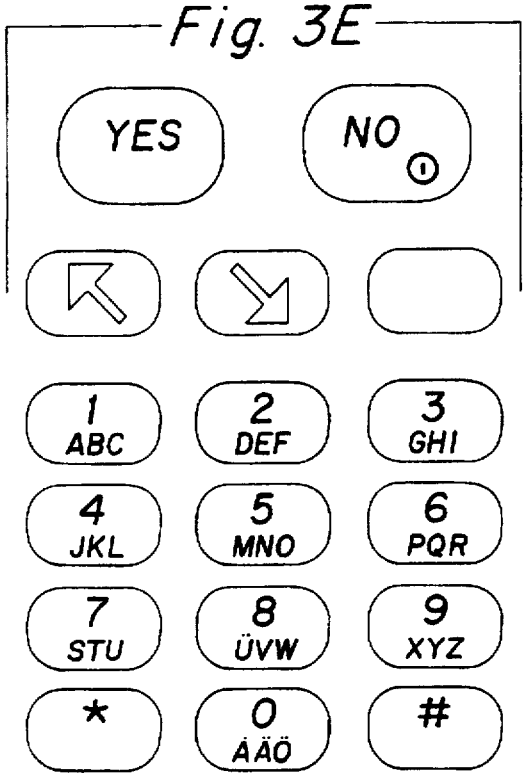
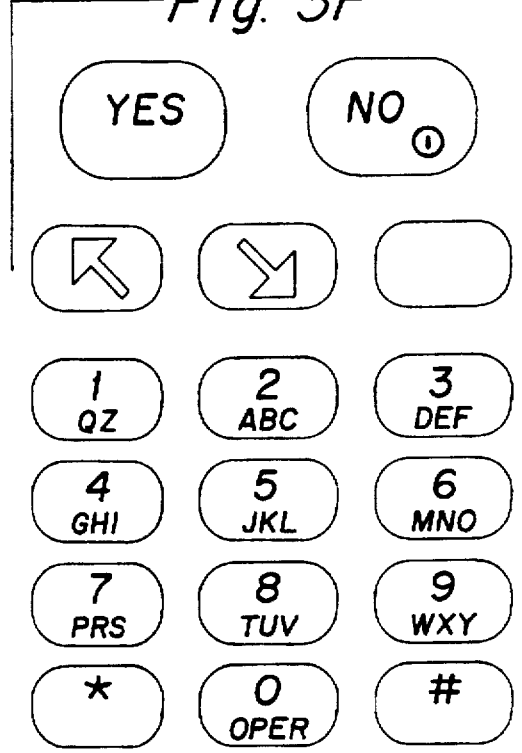
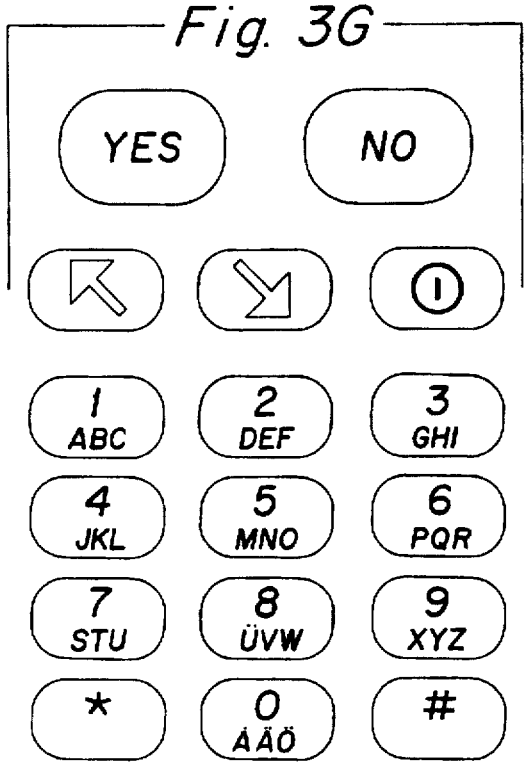
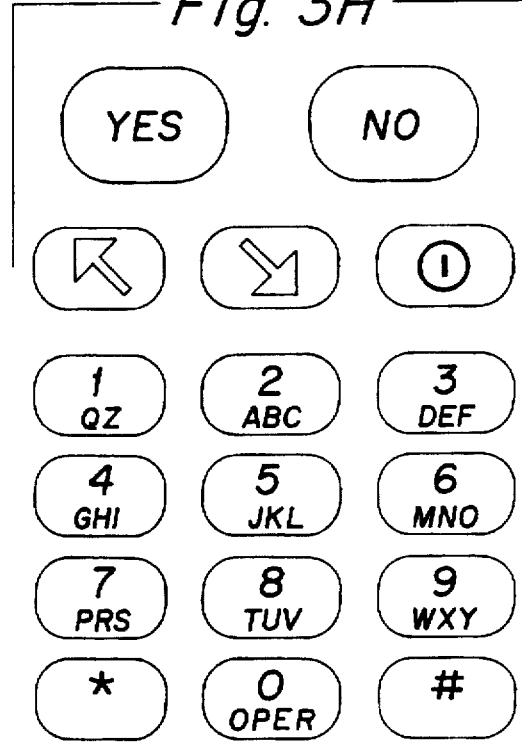

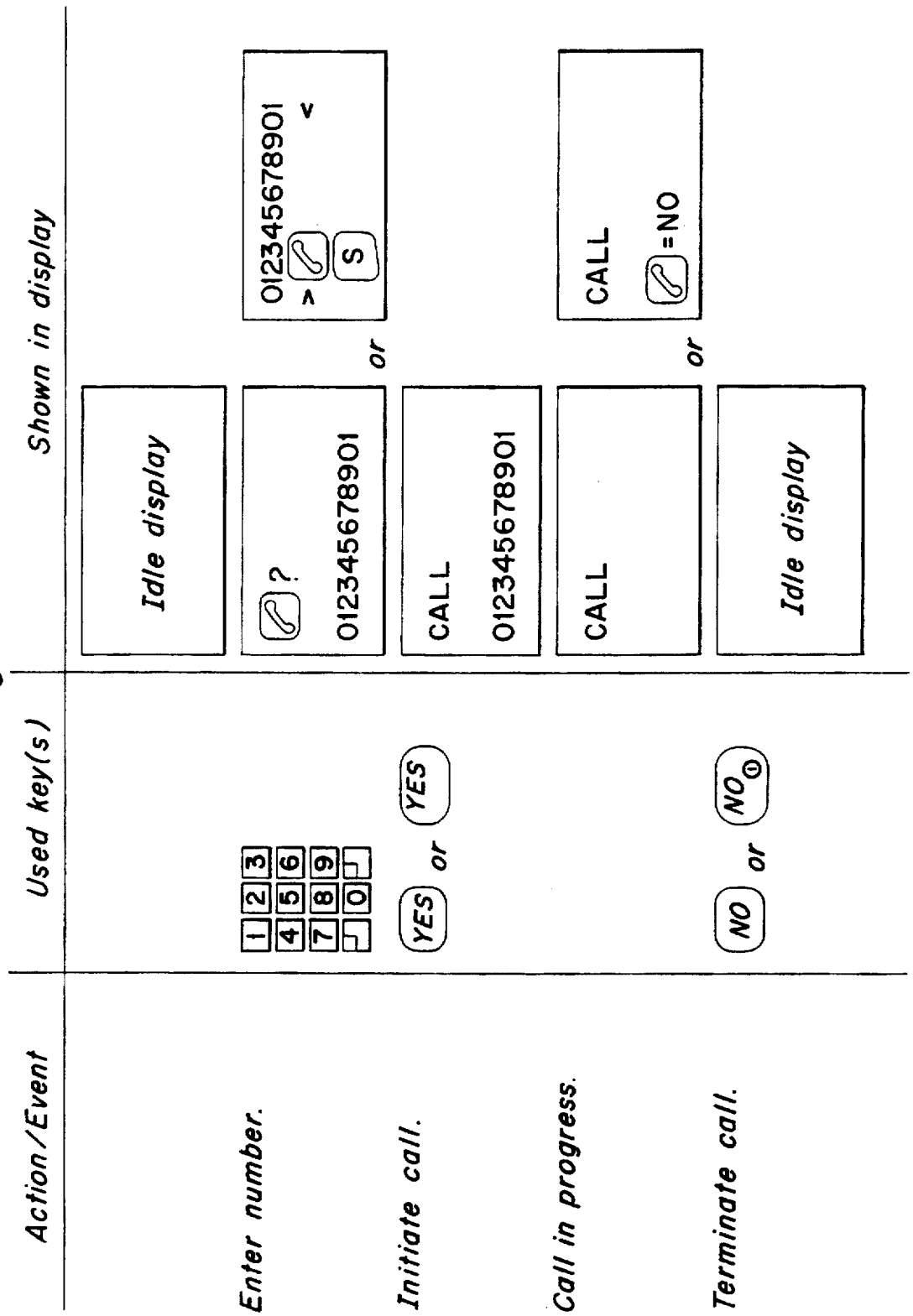

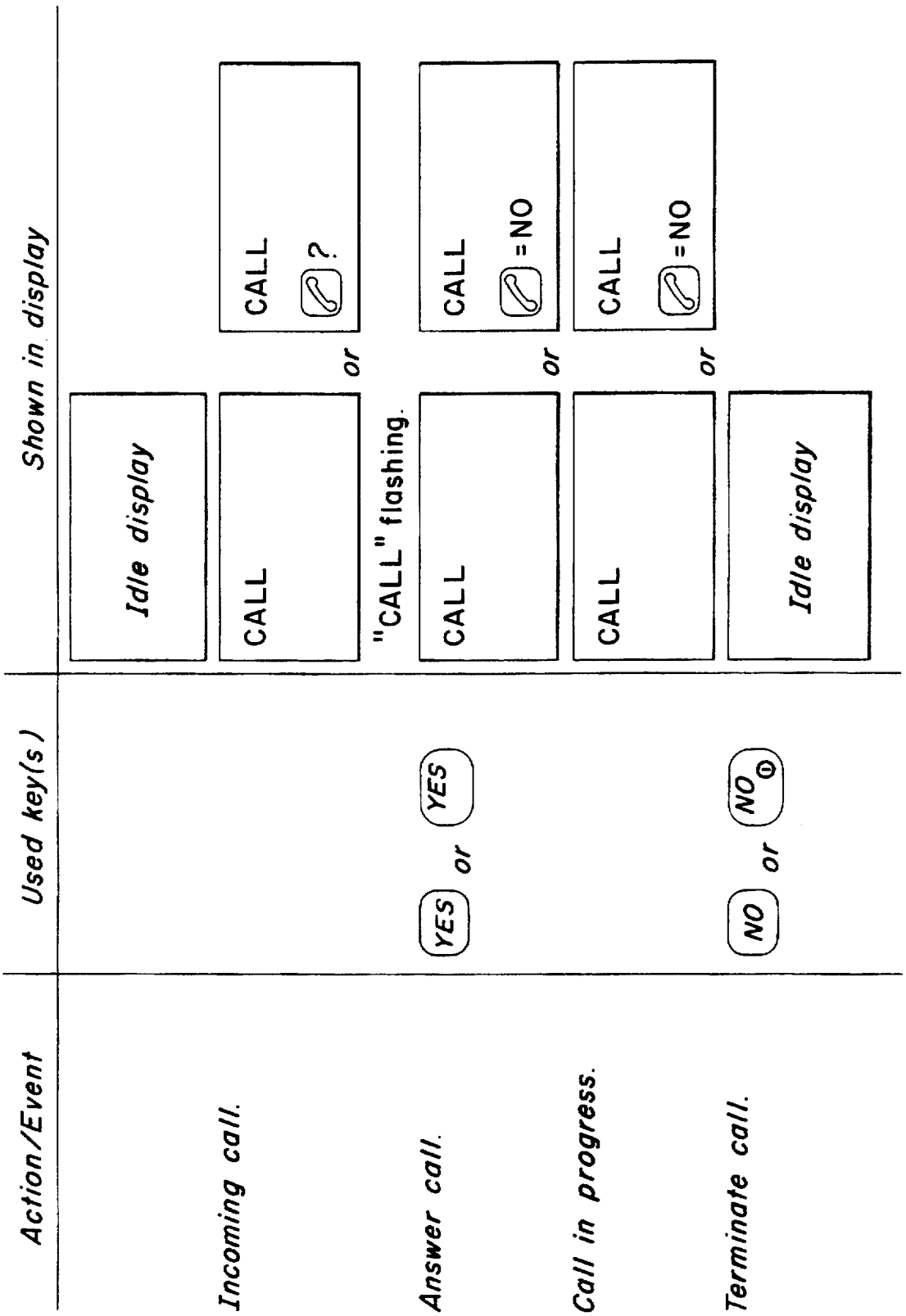

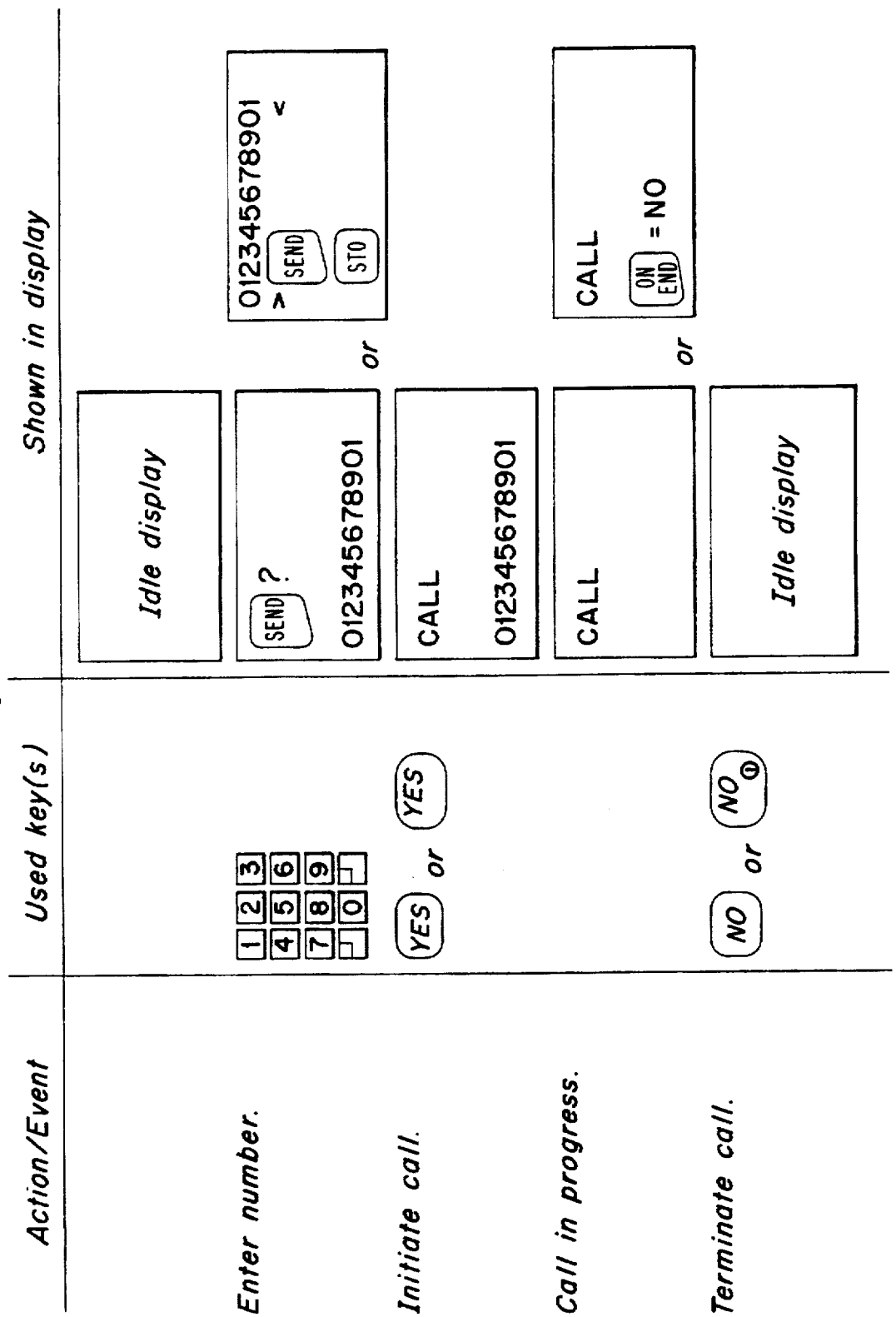

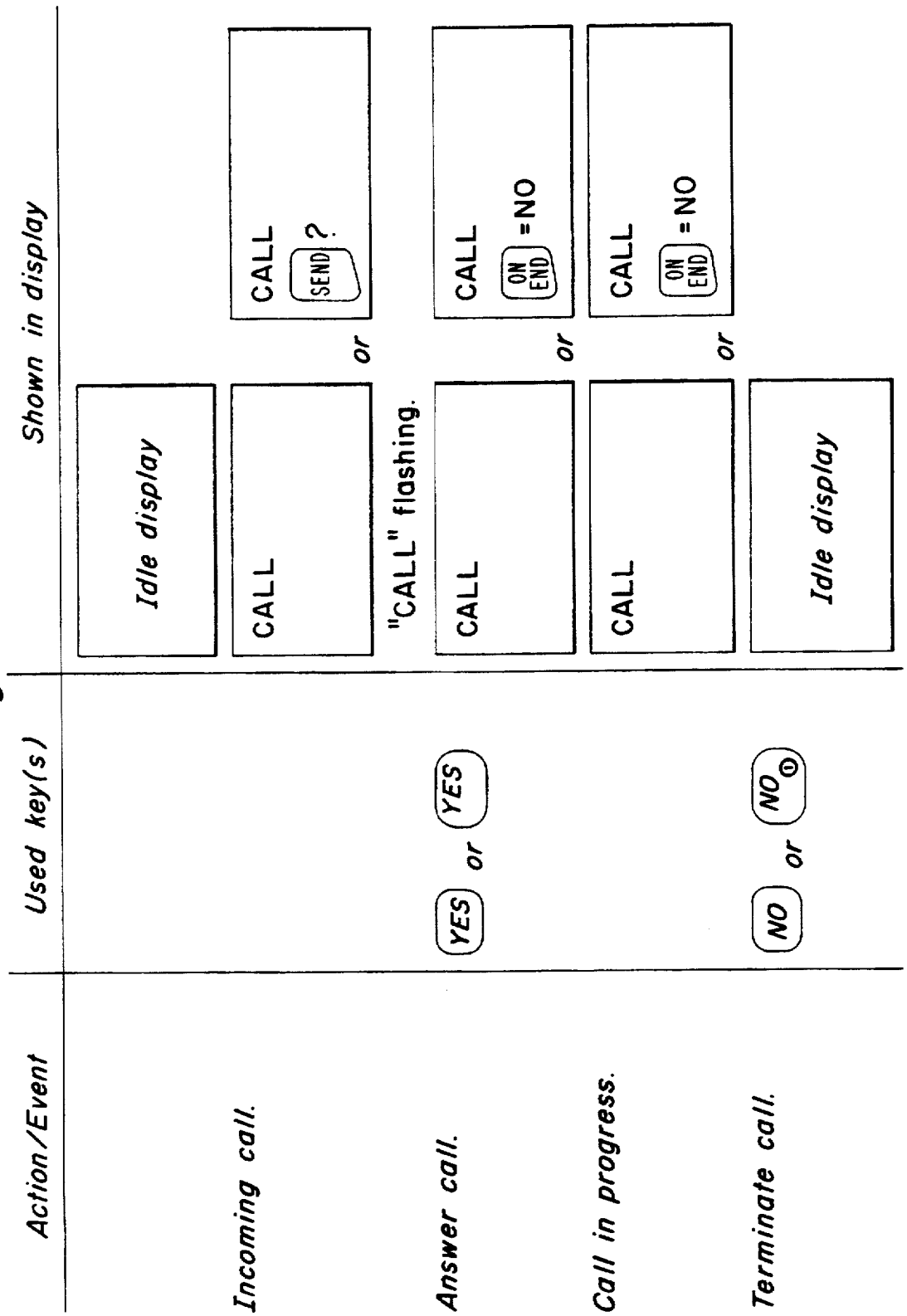

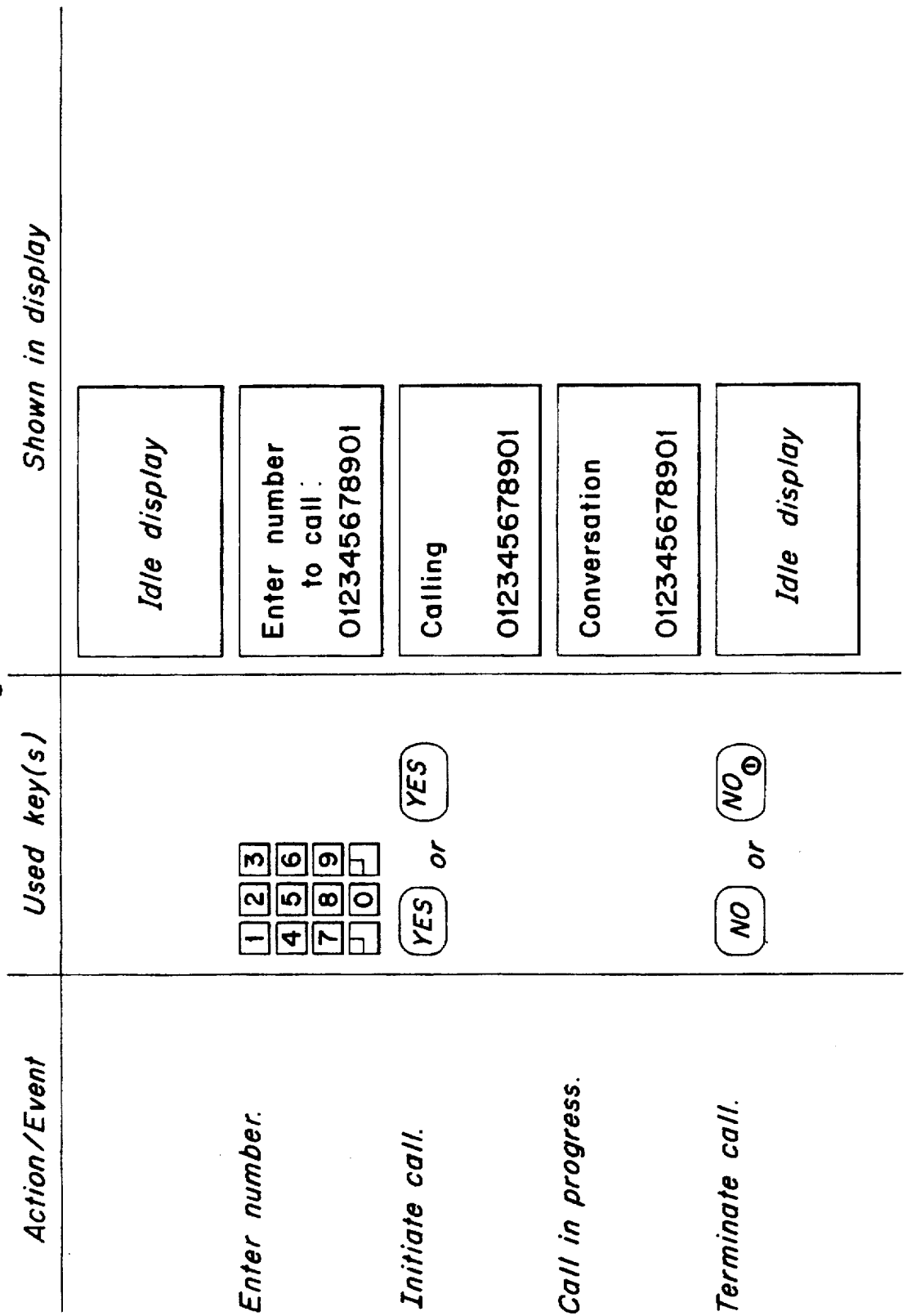

Fig. 9B

| Action/Event | Used key(s) | Shown in display | | |
|---|---|---|---|---|
| | | Idle display | | |
| Incoming call. | | INCOMING CALL Answer? | or | Incoming call > Answer < Transfer |
| Alt. 1) Answer call. | YES or YES | Conversation | | |
| Call in progress. | | Conversation | | |
| Terminate call. | NO or NO₀ | Idle display | | |
| Alt. 2) Reject call. | NO or NO₀ | Idle display | | |

Fig. 10A
 
Fig. 10B
 
Fig. 10C
 
Fig. 10D
 
Fig. 11A
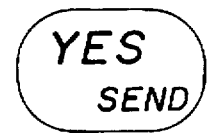 
Fig. 11B
 

UNIFORM MAN-MACHINE INTERFACE FOR CELLULAR MOBILE TELEPHONES

This application is a continuation of application Ser. No. 08/213.704, filed Mar. 16, 1994, now abandoned.

BACKGROUND

The present invention is directed to a man-machine interface apparatus for mobile radio terminals. More particularly, the present invention relates to a new user interface for mobile cellular telephones, involving mainly a new keypad, display and application software.

Today, several different cellular telephone systems use different user interfaces for communicating between the air-interface and the user. These systems include Nordic Mobile Telephony (NMT), Advanced Mobile Phone Service (AMPS), Total Access Communication System (TACS), Global System for Mobile communications (GSM), Digital AMPS (D-AMPS), Personal Digital Cellular system (PDC), Extended TACS (ETACS), Digital European Cordless Telephone system (DECT), Cordless Telephone 2 (CT 2), and Cordless Telephone 3 (CT 3). Such interfaces are specified within the various systems to different degrees of specificity. While cellular telephones may vary to some degree between different manufacturers, they all have to have roughly the same functionality and key configuration according to these systems standards. Examples of such cellular telephone key configurations are shown in FIGS. 1A–1C.

The variations between different standards creates problems for users when they switch between them. To switch between two systems having different user interfaces is difficult because it requires that the users access services and make calls in different ways than they are used to on their home system. This problem is compounded by the use of different interfaces by different models of the same manufacturer.

FIG. 1A illustrates the keypad configuration provided for currently available NMT cellular telephones. FIG. 1B illustrates the keypad configuration provided for currently available AMPS cellular telephones. FIG. 1C illustrates the keypad configuration provided for currently available GSM cellular telephones. More detailed descriptions of these keyboards are available for example, from Ericsson Mobile Communications, Stockholm, Sweden, in "Ericsson NH99, User Manual", publication number SV/LZT 126 1171 R2, "Ericsson AH97, User Manual", publication number CEL/NA-9013 OM, and "Ericsson GH198, User Manual", publication number EN/LZV 109 028 R1A, respectively.

In the NMT system, the cellular telephone includes a keypad 10, a display 9, and a plurality of function keys 1–8 as shown in FIG. 1A. The display 9 has two rows, an alpha-numeric row and a numeric row for displaying respectively alphanumeric and numeric characters. Function key 1 is used to originate, terminate and answer a call. In particular, function key 1 serves as an on- and off-hook key. Function key 2 stores numbers and names in a memory, and stores the setting of certain telephone parameters. Function key 3 clears the last entered character or digit and if pressed for a longer period, clears the entire displayed string. It is used for exiting from the "Menu mode". Function key 4 is used for accessing terminal functions in "Menu mode" and for muting the microphone during conversation. Function key 5 is a register key used during conversation to access various network services. Arrow keys 7 and 8 are used to scroll the menu and to increase and decrease volume during conversation.

In the AMPS system, the cellular telephone includes a keypad 20, a display 29, and a plurality of function keys 21–28 as shown in FIG. 1B. The display 29 is the same as that described above with respect to FIG. 1A. Function key 21 is used to originate and answer a call, that is, as an off-hook key. Function key 22 is used if a call is in progress, to terminate the call, that is, as an on-hook key; otherwise it is used to turn on and off the cellular telephone. Function key 23 is used for recalling numbers stored in the terminal directory (searching by name or abbreviated number), numbers stored in a scratch pad and the last called number. Function key 24 stores numbers and names in a memory, and stores the setting of certain telephone parameters. Function key 25 is used for accessing terminal functions in "Menu mode" and for muting the microphone during conversation. Function key 26 clears the last entered character or digit and if pressed for a longer period, clears the entire displayed string. It is used for exiting from the "Menu mode". Arrow keys 27 and 28 are used to scroll the menu and to increase and decrease volume during conversation.

In the GSM system, the cellular telephone includes a keypad 30, a display 39, and a plurality of function keys 31–38 as shown in FIG. 1C. The display 39 has two rows, an alpha-numeric row and a numeric row for displaying respectively alphanumeric and numeric characters. Function key 31 is used to originate and answer a call, that is, as an off-hook key. Function key 32 is used if a call is in progress, to terminate the call, that is, as an on-hook key; otherwise it is used to turn on and off the cellular telephone. Function key 33 is used for recalling numbers stored in the terminal directory (searching by name or abbreviated number), numbers stored in a scratch pad and the last called number. Function key 34 stores numbers and names in a memory, and stores the setting of certain telephone parameters. Function key 35 clears the last entered character or digit and if pressed for a longer period, clears the entire displayed string. It is used for exiting from the "Menu mode". Function key 36 is used for accessing terminal functions in "Menu mode" and for muting the microphone during conversation. Arrow keys 37 and 38 are used to scroll the menu and to increase and decrease volume during conversation.

Tables 1 and 2 below illustrate one programming difference in the man-machine interface between two systems where Table 1 shows the NMT system and Table 2 shows the AMPS and the GSM system. The tables are read in chronological order from top to bottom and left to right. The sequences shown are used for answering incoming calls, originating outgoing calls and for terminating any calls. As seen in the following Tables, in the NMT system of Table 1, the user presses the same key to answer and to terminate a call. In the AMPS system, different keys are used for the same operations. In the GSM system, the specifications require that different keys are used to answer and to terminate calls.

TABLE 1

| | NMT | |
|---|---|---|
| Event | User Action | Cellular Action/Display |
| Incoming call | | Idle display (manufacturer specific) CALL (flashing) |
| Answer call | Press key "SEND/END" (function key 1) | CALL |
| Call in progress | | CALL |
| Terminate call | Press key "SEND/END" | Cellular does "On-hook". |

TABLE 1-continued

NMT

| Event | User Action | Cellular Action/Display |
|---|---|---|
|  | (function key 1) | Idle display (manufacturer specific) |

TABLE 2

AMPS and GSM

| Event | User Action | Cellular Action/Display |
|---|---|---|
| Incoming call | | Idle display (manufacturer specific) CALL (flashing) |
| Answer call | Press key "SEND" (function key 21 in AMPS, function key 31 in GSM) | Cellular does "Off-hook" and displays: CALL |
| Call in progress | | CALL |
| Terminate call | Press key "ON END" (function key 22 in AMPS, function key 32 in GSM) | Cellular does "On-hook". Idle display (manufacturer specific) |

In a user test carried out by the assignee of the present application within a phone rental project for the AMPS system, it was discovered that Scandinavian users had difficulties in understanding that the "SEND" key was used to answer calls. They felt uncomfortable with using a key named "SEND" when they were actually receiving something.

Tables 3 and 4 below illustrate a difference between the NMT and the DECT systems, respectively, for the procedures involved in originating and terminating outgoing calls.

TABLE 3

NMT

| Event | User Action | Cellular Action/Display |
|---|---|---|
| Enter number | Enter digits | Idle display (manufacturer specific) Displays: entered number |
| Originate call | press key "SEND/END" (function key 1) | Cellular does "Off-hook" and calls entered number. Displays: CALL entered number |
| Call in progress | | CALL |
| Terminate call | Press key "SEND/END" (function key 1) | Cellular does "On-hook" Idle display (manufacturer specific) |

TABLE 4

DECT

| Event | User Action | Cellular Action/Display |
|---|---|---|
| Enter number and originate call | Press key "SEND/PAGE" and then enter digits OR enter digits and then press key "SEND/PAGE" | Idle display (manufacturer specific) Cellular does "Off-hook" immediately and transmits digits as they are entered OR cellular does "Off-hook" and |

TABLE 4-continued

DECT

| Event | User Action | Cellular Action/Display |
|---|---|---|
| Call in progress | | calls entered number. Displays: entered number |
| Terminate call | Press key "SEND/PAGE" | entered number Cellular does "On-hook". Idle display (manufacturer specific) |

In the NMT system of Table 3, the user enters desired digits and then presses "SEND/END" to make a call, whereas in the DECT system of Table 4, the user also has the option of first pressing "SEND/PAGE" and then entering desired digits. The functionality of the key "SEND/PAGE" is also cryptic to the user. A third situation is presented by the AMPS and GSM systems, in which two different keys are required to respectively originate and terminate a call, as shown in Table 5.

TABLE 5

AMPS and GSM

| Event | User Action | Cellular Action/Display |
|---|---|---|
| Enter number | Enter digits | Idle display (manufacturer specific) Displays: entered number |
| Originate call | Press key "SEND" (function key 21 in AMPS; function key 31 in GSM) | Cellular does "Off-hook" and calls entered number. Displays: CALL entered number |
| Call in progress | | CALL |
| Terminate call | Press key "ON END" (function key 22 in AMPS; function key 32 in GSM) | Cellular does "On-hook". Idle display (manufacturer specific) |

Thus, the problems with cellular user interfaces of today is that they differ in appearance and functionality between different cellular systems as well as between model generations. The user then has to re-learn how to use these cellular telephones every time he/she changes to a new system environment or to a new model. This can be difficult because the telephone user interfaces are not generally user friendly. These interfaces are almost solely hardware dependant, i.e., keypads and displays, making it costly for manufacturers to comply with different system standards.

Dual-mode cellular mobile telephones which can be used to interface with analog and digital traffic channels are known. For example, the EIA/TIA IS-54 standard specifies such an air-interface. However, the setting up of calls uses analog control channels and procedures have been designed to be common for analog and digital traffic channels.

Multi-mode cellular mobile telephones which can be used to interface with analog and digital traffic and control channels are also known. For example, U.S. application Ser. No. 07/751,763, filed Aug. 29, 1991, incorporated herein by reference, discloses a cellular mobile radio telephone system where modified analog and dual-mode mobile radio telephones may select and use either analog or digital control channels. However, these systems also relate to the communication between mobile telephones and the one standardized cellular land system in which procedures have been designed to be common.

Two different systems using more or less the same man-machine interface are also known, i.e., AMPS, first used in the U.S. and TACS, first used in the U.K. The standards of the two systems regard the air-interface, leaving the man-machine interface open. But TACS terminal implementation copied the earlier defined AMPS.

Combined cordless and cellular mobile telephones which can be used to work via different air-interface standards are also known. For example, U.K. patent application 2,225,512 describes a cellular/cordless radio telephone. However, the patent does not described a man-machine interface usable with any air-interface.

In the future, it is anticipated that a satellite phone system for wireless pocket phones will cover the entire planet, which means that it will cover several different cellular system standards. The satellite system will probably have one method, i.e., key sequence, defined for every action (which is cost efficient), for example, one for making and one for receiving calls, whereas the cellular system standards have differing methods for these actions. This fundamental problem can, using a "normal" cellular phone user interface, only be solved in two ways. The satellite system has to be implemented with several different methods for similar actions, i.e., one method corresponding to each cellular system standard. This is very costly and technically difficult to implement. Alternatively, the user has to use one method for an action on the cellular system and another different method for the same action on the satellite phone system. This is not a user friendly solution.

Another problem facing cellular telephone manufacturers today involves the decreasing size of cellular telephones. As telephones get smaller, it becomes more and more difficult to include as many function keys as has conventionally been used in key sizes which are practical for use.

SUMMARY

The present invention is intended to overcome the disadvantages described above.

One object of the present invention is to provide a user interface which can be used with several cellular telephone systems, such as NMT, AMPS, TACS, GSM, D-AMPS, PDC, ETACS, CT 2, CT 3, and DECT, which are used around the globe. The presented user interface can also be used on future pocket-sized wireless satellite telephones.

Another object of the present invention is to provide single mode mobile cellular telephones with a man-machine interface which is the same for all cellular telephone systems, making it possible for people to rent a foreign mobile telephone when they travel abroad which has a man-machine interface with which they are familiar.

Another object of the present invention is to provide a user interface which can be used on a dual or multi-mode cellular telephone, that is, a telephone containing hardware components for two or more systems standards, such as NMT and GSM. This cellular telephone could then be used in several system environments, where choice of and access to one of these standards is performed according to some predefined algorithm or by a manually operated switch. The emulation, using software, of different standards could thus be independent of the choice of the different hardware components. This dual or multi-mode telephone can also be comprised of a cellular-satellite phone, that is, a phone containing components for one (or more) cellular system standard(s) together with components for one (or more) satellite system standard(s).

Another object of the present invention is to provide a man-machine interface that enables cellular telephones to be lighter and smaller than conventional cellular telephones.

Another object of the present invention is to provide a cellular telephone having a reduced number of keys, eliminating the need for traditional on-hook and off-hook keys.

According to one embodiment of the present invention, a mobile radio terminal comprises an output means for outputting at least one menu, the menu comprising at least one branch for processing telephone calls, each of the branches comprising at least one option for choosing a corresponding action to be performed by the radio terminal, the corresponding action including causing a successive branch to be displayed and performing a terminal function, selection means for designating one of the options, first means for confirming selection of the option designated by the selection means, thereby moving forward through the menu to a succeeding branch of the at least one branches and performing the corresponding action chosen by the confirmed option, and for originating and answering telephone calls, second means for rejecting selection of the option designated by the selection means, thereby moving backward through the menu to a preceding branch of the at least one branches, and for terminating telephone calls.

According to another embodiment of the present invention, a mobile radio terminal comprises means for emulating procedures provided by a plurality of different air-interface signalling standards, an output means for outputting a plurality of menus, each having at least one option for processing telephone calls according to one of the plurality of air-interface signalling standards, user input means for selecting one of the plurality of menus to be output at any given time, selection means for designating one of the options in the output menu, first means for confirming selection of the option designated by the selection means, thereby moving forward through the menu, and for originating and answering telephone calls, and second means for rejecting selection of the option designated by the selection means thereby moving backward through the menu and for terminating telephone calls, and at least one navigation key for moving the selection means between options in the menu.

According to another embodiment of the present invention, a dual-mode mobile radio terminal comprises at least two hardware component means for implementing at least two different air-interface standards, means for selecting one of the at least two hardware component means, software means for emulating procedures provided by a plurality of different air-interface signalling standards, an output means for outputting a plurality of menus, each having at least one option for processing telephone calls according to one of the plurality of air-interface signalling standards, user input means for selecting one of the plurality of menus to be output at any given time, independently of the selected one of the at least two hardware component means, the user input means comprising a twelve-key alphanumeric keypad and selection means for designating one of the at least one option in the output menu, a first key for confirming selection of the one of the at least one options designated by the selection means, thereby moving forward through the menu, and for originating and answering telephone calls, and a second key for rejecting selection of the one of the at least one options designated by the selection means thereby moving backward through the menu and for terminating telephone calls.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIGS. 3A-3H illustrate examples of general keypad configurations according to the present invention;

FIGS. 6A and 6B illustrate emulated NMT procedures for outgoing and incoming calls, respectively, according to an embodiment of the present invention;

FIGS. 7A and 7B illustrate emulated AMPS procedures for outgoing and incoming calls, respectively, according to an embodiment of the present invention;

FIGS. 9A and 9B illustrate system independent procedures for outgoing and incoming calls, respectively, according to an embodiment of the present invention;

FIGS. 10A-10D illustrate alternative embodiments of the YES/NO keys for NMT and GSM systems according to the present invention; and FIGS. 11A-11B illustrate alternative embodiments of the YES/NO keys for AMPS systems according to the present invention.

GENERAL DESCRIPTION OF THE INVENTION

Figure 1C:
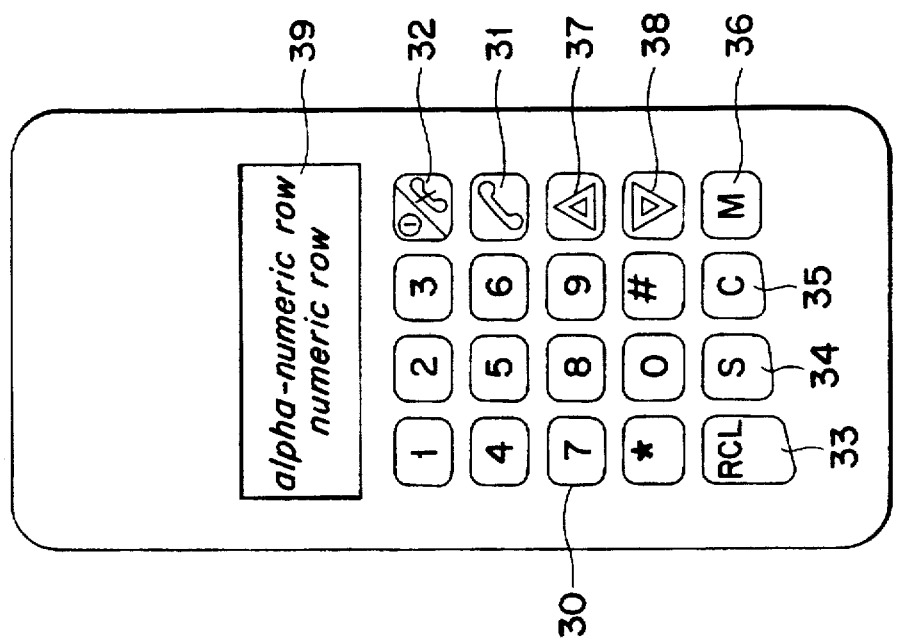
FIGS. 1A, 1B, and 1C are examples of system specific hardware implementations of a conventional cellular mobile telephones in the NMT, AMPS, and GSM systems, respectively.

The present invention is directed to an apparatus for providing a uniform user friendly man-machine interface for mobile radio terminal call origination and call termination, substituting the system specific man-machine interfaces used to date for this purpose for the various mobile radio systems. The uniform man-machine interface does not require changes to different air-interface signaling standards used by the terminals. The signaling differences are taken care of by software in the terminals. An interactive uniform dialog is performed by the user whereby selectable options are displayed to the user on a display and whereby the user indicates his/her choice of options using YES and NO keys for confirmation and rejection, respectively, and for example, arrow keys for pointing at options. The options are presented in the form of menus where the menu can be said to include a trunk (the main menu) and/or one or more branches.

Each branch has one or more options that, when selected, perform a corresponding action, either in the form of causing another branch to be displayed, or performing a mobile radio terminal function. For purposes of this description, if a branch has only one option, it is still referred to as a branch.

The YES key provides the function of advancing through the branches of the menus and the NO key provides the function of moving back through the previously displayed branches of the menus. The YES and NO keys are also used to provide the functionality of conventional off-hook and on-hook keys, respectively, thus eliminating the need for separate off-hook and/or on-hook keys. In this way, the present invention provides advantages over the prior art by reducing the number of keys required on the cellular telephone.

The functions of the keys and displayed options are identical in identical situations but the labels of the keys may vary depending on the language of the country where the terminal is sold. Language independent icons may be used on the keys where appropriate. The language of the displayed options may be selectable by program.

The invention allows the user to travel between countries with different air-interface signaling standards, present and future, without the need to use different keypads and/or procedures for call originating, answering and terminating. Thereby, the user may use single mode terminals capable of signaling via the respective air-interface only, or dual-mode or multi-mode terminals with several selectable air-interfaces, but with identical man-machine interaction for call originating, answering and call terminating.

What is uniform in the inventive terminal and system is firstly, the keypad and the designations (text, icons) on or near the keys, secondly, the displayed options regarding originating, answering and terminating of calls, and thirdly, the sequence of events, i.e., the flowchart for originating, answering and terminating calls. What is selectable in or for the inventive terminal and system is the radio (hardware) module and an associated air-interface signaling (software) module which will be available as one out of at least two possible radio modules with associated software modules for compliance with the local cellular standard and for connecting to the uniform man-machine interface module. Additionally, it is possible that a particular radio hardware module will be selected, for example, because the terminal is being used in a GSM network area instead of its home NMT area, however, the user may independently choose to have the system emulate the NMT system for placing calls using the uniform interface according to the present invention. In this way, the particular air-interface standard in use in the area does not mean that the user must have a new user interface.

Using the present invention for the mentioned basic call origination and disconnection functions, but having non-uniform displayed options and procedures regarding more advanced features is possible, although it is preferred to use uniform procedures, whenever possible, for the advanced features as well as for the basic functions.

Although the invention is directed to a uniform man-machine interaction for call originating, answering and terminating, the invention allows departing from this uniform man-machine interaction when appropriate. Two examples follow.

When a mobile subscriber has bought a new radio terminal according to the present invention, he/she may emulate the procedures of a previously used terminal, providing its procedures and keys as "soft keys", i.e., options, on the display of the new radio terminal. The selection between an "old" and the "uniform" procedure may be performed by, for example, a hardware switch or a software switch selecting the appropriate menu option presented in the display.

When a subscriber having a terminal according to the present invention wants to use it with any intelligent nodes and any procedures for services additional to the normal originating, answering and terminating of calls, the additional procedures used may not be the same in different regions for the same function, but the interactive dialog allows using these procedures without memorizing anything, because the options are always presented on the LCD display.

DETAILED DESCRIPTION

According to the present invention, a globe-trotter man-machine interface is provided for use on cellular mobile telephones to allow the telephone to be used with several cellular telephone systems, such as NMT, AMPS, D-AMPS, TACS, ETACS, GSM, ADC, and PDC, which are used around the globe. This is done by perceiving the cellular telephone as a computer platform on which different software applications, system and/or customer, are downloadable. The cellular telephones are equipped with a suitable key configuration and display to support these applications. In this way, if a system standard, such as NMT, AMPS, etc., is perceived as a software application, it is possible to build one hardware platform covering all, or almost all, systems. Of course, the hardware platform must comprise the (hardware) components such as radios and antennas for the air-interfaces to be used, as explained in more detail as follows.

According to one embodiment, the system according to the present invention can be implemented on a cellular telephone that includes only components to allow it to communicate according to one system standard, such as GSM. In this way, when the user of that telephone travels to another region using a different standard, such as NMT, he/she can use a telephone that is equipped with components to handle that second standard without learning a different interface. According to another embodiment, the invention can be implemented on a dual or multi-mode telephone which includes the components to communicate according to more than one system standard, such as NMT and GSM systems.

Figure 1A:
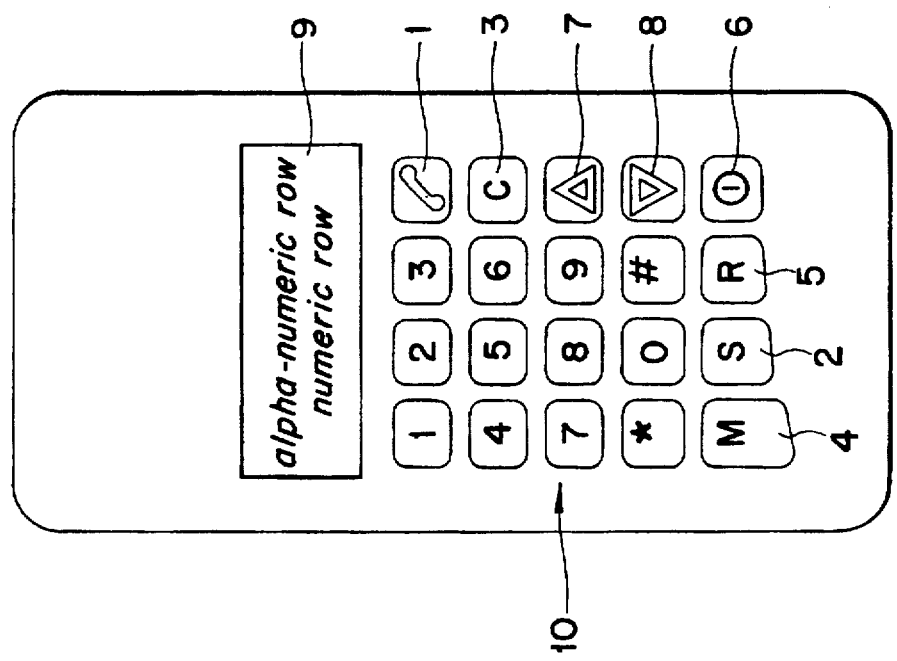
Figure 1B:
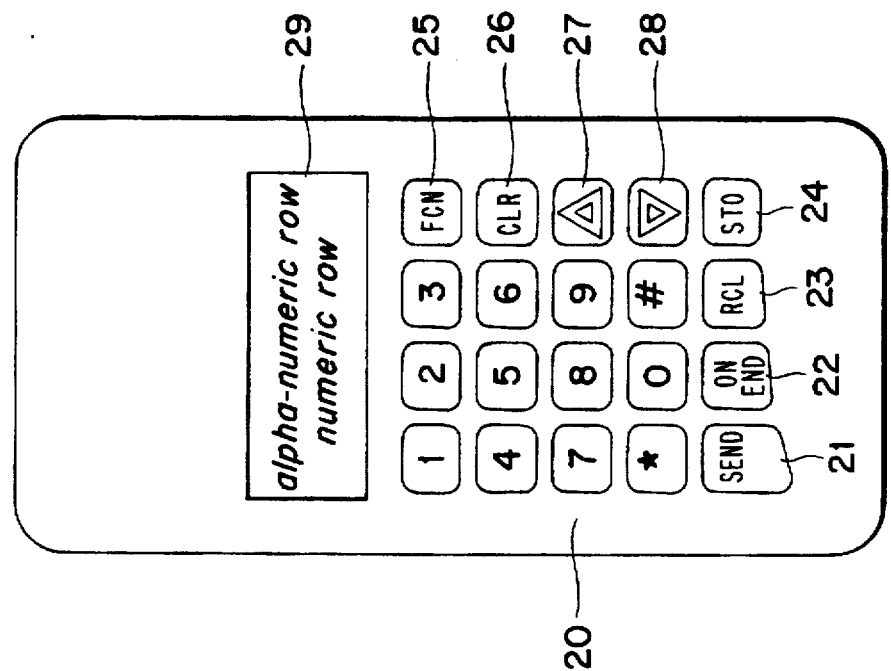

A system and/or customer application is down-loaded into the cellular telephone memory. Commands which conventionally were handled by pressing specific designated keys, such as the "SEND" or "RCL" keys in FIG. 1, are handled according to the present invention by presenting a unified command (i.e., standard independent) in the display and then pressing a general application supporting key to activate this command.

Figure 2A:
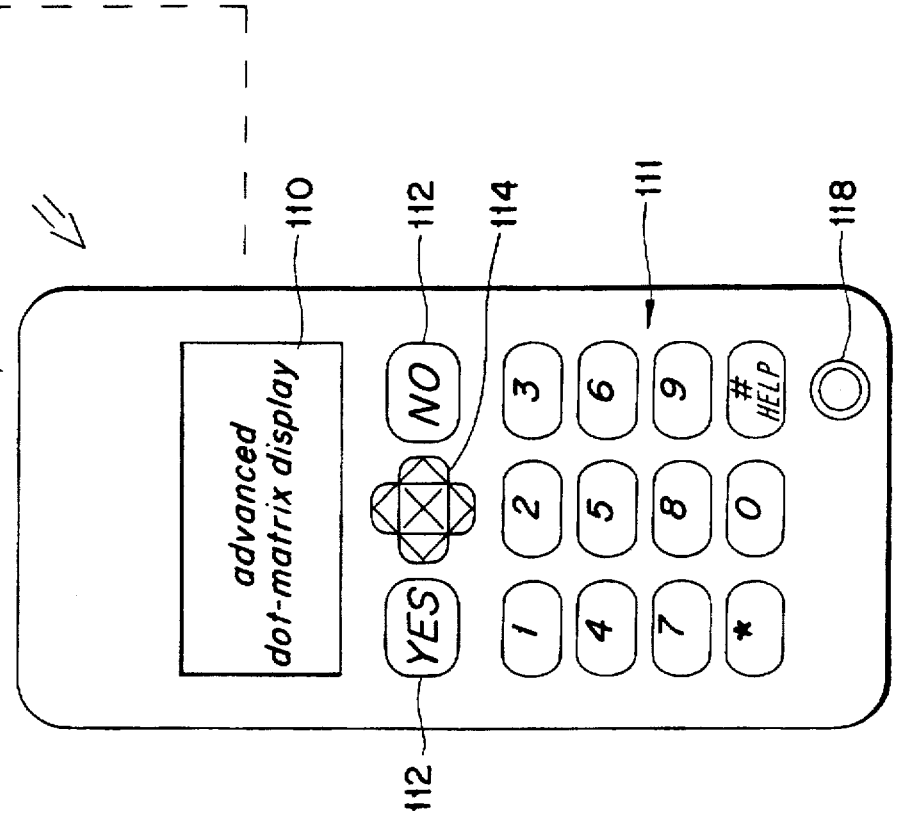
FIG. 2A is an example of a general hardware platform of a cellular mobile telephone according to one embodiment of the present invention.

One example of a general hardware platform of a cellular mobile telephone according to one embodiment of the present invention is shown in FIG. 2A. The cellular mobile telephone includes an advanced dot-matrix display 110. Keypad 111 includes the traditional number keys 0–9 (the corresponding alpha characters not shown are provided on the number keys in the conventional manner), a "*" key, a "# HELP" key, and two general application supporting keys YES and NO 112. Of course, keys with comparable meaning and in contrast to each other as, for example, OK and CANCEL can also be used. According to one embodiment, an ON/OFF key 118 is also provided to turn on and off the cellular telephone. The system and/or customer software (SW) application 116 is down-loaded into the memory.

Further, an arrangement of four arrow keys or a cross-arrow key 114 having four arrows is provided to allow navigation within the displayed text or displayed icons and symbols. The arrow key, or navigation key, is used to navigate through menus, texts and/or icons either by scrolling through single menu lines vertically or by moving a cursor between a plurality of menu options displayed on a single display screen, as well as edit numbers and characters by scrolling the cursor sideways. That is, the arrow keys navigate a cursor through the different options in the same branch of the menu or between branches in the menu. The navigation key may be a cross-arrow key having four sides, each side having an arrow pointing in a respective direction, as shown in FIGS. 3A and 3B. Alternatively, four arrow keys pointing in respective upward, downward, and sideward directions may be used. As an alternative embodiment, as shown in FIGS. 3C and 3D, the navigation key may be a single key having two arrows, one pointing upward (with reference to the paper) and one pointing downward. A third embodiment is shown in FIGS. 3E–3H, in which two arrow keys are used, each having an arrow pointing in opposite directions on an angle with respect to the vertical.

Figure 2B:
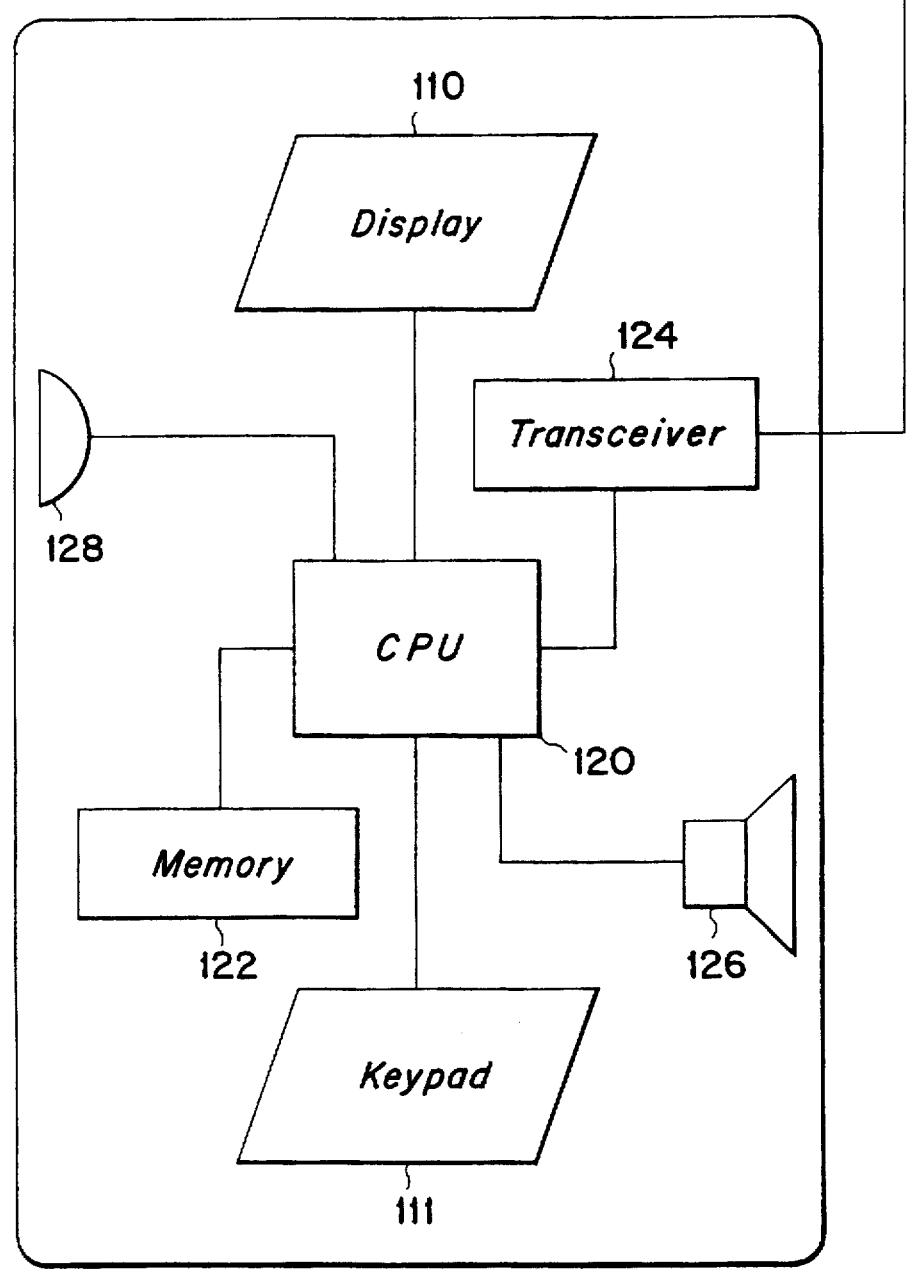
FIG. 2B is a block diagram of the pertinent portions of a cellular mobile radio telephone according to the present invention.

FIG. 2B is a block diagram of the pertinent portions of a cellular mobile radio telephone according to the present invention. The telephone includes a central processing unit CPU 120 for controlling the various parts of the cellular telephone, a memory 122 for storing the control programs of the telephone, as well as other information used by the telephone, such as prestored telephone numbers, etc., and a transceiver section 124 which transmits and receives the control and traffic signals over the air-interface. The cellular telephone also includes the display 110, keypad 111, loudspeaker 126 and microphone 128.

According to a possible embodiment of the present invention, a display 110 is provided with a 4×20 position dot-matrix display with high resolution. The resolution should preferably be above about 50 dpi. The display area is preferably not divided into smaller areas thereby making it possible to generate any kind of graphics, as well as characters. With a display of this type, it is possible to generate icons and symbols resembling a Windows™ type of user interface. Such an interface is very powerful since common knowledge of this interface is widespread and growing rapidly.

Two possible keypad 111 configurations according to the present invention are illustrated in FIGS. 3A and 3B. The YES key is used to confirm the displayed proposition or selection, for example, such as a menu option, directory entry, entered number, or entered name, that is, move to the next successive menu branch, indicated by the selection designated in the display. The YES key also performs the function of answering an incoming call or originating an outgoing call, that is, the "off-hook" function. The NO key is used to reject a proposition or selection and return to the previous menu branch. The NO key is also used to terminate an on-going call, that is, the "on-hook" function. The cross-arrow key, or navigation key, is used to navigate through menus, texts and/or icons as described above. The circular key at the bottom of the figures is the on/off key, used to turn on and off the power to the telephone.

FIGS. 3C and 3D illustrate alternative embodiments according to the present invention. The YES, NO, and on/off keys operate in the same manner as described above with respect to FIGS. 3A and 3B, and so will not be discussed further. The two-arrow key is used to scroll menus and texts vertically, but cannot be used to edit numbers and characters sideways. The NO key may be used to edit numbers or characters by rejecting the displayed string. The depression of the NO key either causes a return to the previous state, and the string could then be re-entered or deletes the last entered digit/character and when the string is empty causes a return to the previous state.

FIGS. 3E–3H illustrate alternative embodiments according to the present invention. The YES and NO keys operate as above, although in FIGS. 3E and 3F, the NO key also is used to turn on and off the power. Thereby, one key becomes unused and may be labeled, e.g., as a HELP key to fetch explanations to be displayed, whereby return to the previous state could be achieved by the NO key. The arrow keys scroll in different directions depending on the mode. In particular, in a menu or text mode, the arrow keys scroll the menus and texts vertically. In a digit or character mode, the arrow keys edit numbers and characters by scrolling the cursor sideways. The decision whether scrolling is vertical or sideways is dependent on the option selected in the menu.

A cellular mobile telephone viewed as a platform on which several applications, system and/or customer, can be down-loaded provides possibilities of designing and developing advanced as well as user friendly telephones. It makes it much easier to introduce and upgrade advanced customized applications targeting specific user groups. Cellular telephones for different systems as well as new models are then software modifications. It is with this view and this solution possible to define a uniform user interface for telephones, mainly cellular, but also other types as used for example, in trunked radio or satellite systems.

By using an advanced display together with one of the keypads described above, it is possible to emulate existing models of mobile stations and to eliminate the cryptic system specific keys from the keypad, as for example "FCN", "STO", "RCL", etc. These keys are instead presented in the display in the form of menu options, i.e., "soft keys", and their functions are activated by pressing the "YES" key when marked by a cursor.

Figure 4:
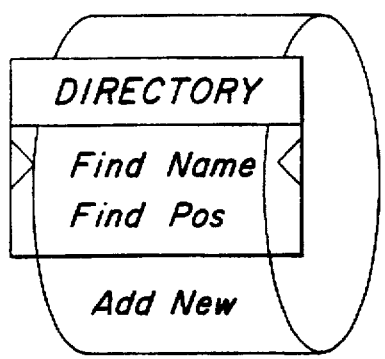
FIG. 4 illustrates the operation of the menus according to an embodiment of the present invention.

In particular, the user marks his/her choice by stepping up or down using the arrows in arrow key 114 of FIG. 2A to move the cursor to the desired location. He/she then selects the designated menu item by pressing the "YES" key. A sample menu is shown in FIG. 4. According to one embodiment, the menus operate as rotating drums, which are rotated in both directions without beginning or end. According to one embodiment, a selection is marked with two arrows as the cursor. When the cursor hits the display's bottom or top, by movement of the arrow key 114, for example, the menu is shifted one step up or down, respectively. The cursor can also be fixed in the display causing the menu to be shifted up or down every time an arrow key is pressed.

Another variety of moving around in the branches of a menu is to scroll the text horizontally when the arrow keys are pushed. In this case, the cursor is the window itself and does not need to be indicated in the window.

There are essentially two methods for displaying menu options according to the present invention. One possibility is that several options for example, the options available in a single branch, are displayed simultaneously by using one display row per option and the selection means for designating one of the options is a cursor which moves between the displayed options. In this case, it is easier for the user to get an overview of all possible menu options in the current (cellular) state. However, it is not possible to show the current active setting of the separate menu options. For example, it would not be possible to display:

> Ring Signal <
(High)

where "High" is the current active setting for the menu option "Ring Signal".

Alternatively, only one menu option may be displayed at a time by using all the display rows for this option and the selection means for designating one of the options is implemented by the movement of the options in the display provided by the scrolling of the menu between the options, caused by use of the arrow keys, where stepping between branches of the same menu uses horizontal scrolling of the displayed text. In this case, it is possible to show the current active setting of the separate menu options when displaying each one, however, it is difficult to get an overview of all the possible menu options in the current (cellular) state.

The following Tables 6–7 illustrate the same two communication examples as shown in Tables 1–5, respectively, using the keypad and display according to the present invention. Table 6 illustrates the NMT and AMPS system for answering an incoming call and ending a call according to a preferred embodiment of the present invention.

TABLE 6

| NMT and AMPS | | |
| --- | --- | --- |
| Event | User Action | Cellular Action/Display |
| Incoming call | | Idle display (manufacturer specific) Cellular rings, ANSWER? is displayed or a menu option ANSWER is marked by a cursor in the display |
| Answer call | Press "YES" key | Cellular does "Off-hook" Call-in-progress display (manufacturer specific) |
| Call in progress | | Call-in-progress display (manufacturer specific) |
| Terminate call | Press "NO" key | Cellular does "On-hook" Idle display (manufacturer specific) |

In both cases, the user is prompted to answer the call in the display and accepts by pressing "YES". He/she can, of course, reject the call by pressing "NO". When in conversation, he/she terminates the call by pressing "NO", i.e., thus ending/rejecting the current state of "call in progress".

Table 7 below illustrates the NMT and DECT systems for originating a call according to one embodiment of the present invention.

TABLE 7

| NMT and DECT | | |
| --- | --- | --- |
| Event | User Action | Cellular Action/Display |
| Enter Number | Enter digits | Idle display (manufacturer specific) Displays: entered number |
| Initiate Call | Press "YES" key | Cellular does "Off-hook" and calls entered number. Displays: CALLING |

TABLE 7-continued

NMT and DECT

| Event | User Action | Cellular Action/Display |
|---|---|---|
| Call in progress | | entered number<br>Call-in-progress display<br>(manufacturer specific) |
| Terminate call | Press "NO" key | Cellular does "On-hook".<br>Idle display<br>(manufacturer specific) |

Again, the YES key is used to confirm a proposition, i.e., the entered number, and thereby making the call. Of course, NO can be used to reject the entered number and return to the previous branch of the menu.

Thus, the YES and NO keys together with the information in the display provide human control in every situation in an easy-to-learn and easy-to-use way. It is with this configuration possible to cover all communication examples with exactly the same procedure, YES to confirm a proposition or selection and thus move forward within the branches of the menu, and to perform the off-hook function, and NO to reject a proposition or selection and thus move backward to the preceding branch of the menu, and to perform the on-hook function.

In this way, the invention provides the ability for the user to recognize what actions to do when he/she is in similar situations but in different system environments, where these actions are comprehensible as well as consistent and also reduces the number of keys required on the cellular telephone.

The above described invention can also be used on a dual or multi-mode cellular telephone, that is, a telephone containing hardware components for two or more systems standards. This cellular telephone can then be used in several system environments, where choice of and access to one of these standards is performed according to some predefined algorithm such as scanning available control channels or by operating a manual switch. This selection may be made independently of which emulation mode is chosen.

Figure 5:
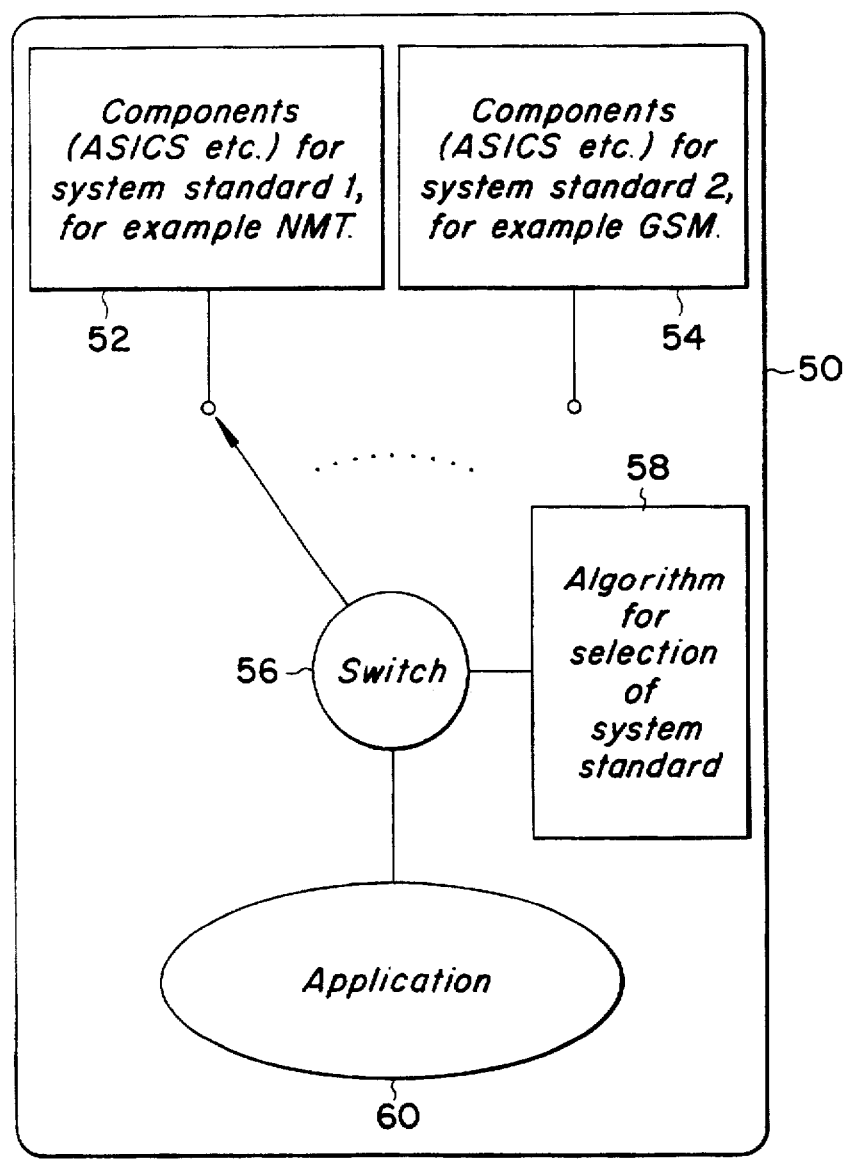
FIG. 5 illustrates a block diagram of system specific hardware components inside a dual-mode cellular phone according to an embodiment of the present invention.

FIG. 5 is a block diagram for system specific components inside a dual-mode cellular telephone 50. The blocks 52 and 54 are the hardware components for system standard 1 and 2, respectively. An example of such a telephone includes NMT components as standard 1 and GSM components for standard 2. The contents of the blocks 52 and 54 are within the skill of the ordinary artisan once in possession of the instant disclosure. The telephone switches between the two component blocks 52 and 54 at any given time by actuation of a switch 56 according to an algorithm 58 for selection of a system standard dependent at least in part on the location of the mobile radio terminal. Thus, the user can move the mobile terminal to an area using one system standard, e.g., GSM, to an area using another, e.g., NMT, by activating the appropriate block. Application 60 is the software which controls and runs the telephone, which can consist of a system and/or customer software application.

The algorithm 58 for selecting one of two or more system component blocks can be defined in several different ways. The following is a description of two of such possibilities.

The first selection algorithm is implemented according to the principles specified in co-pending application Ser. No. 07/751,763, filed Aug. 29, 1991, discussed above. The co-pending application covers control channel scanning procedures for analog and digital control channels for the North American market. However, in this case, traffic channels belong to the same IS-54 standard, whereas at least two different cellular standards are considered for the present invention.

The second selection algorithm involves the case in which the different system standards implemented in a cellular telephone are also separated geographically. If so, then the user selects the country in which he/she is currently located and the correct system component block is selected in the terminal through a table look up.

As discussed above, the uniform interface keypad illustrated in FIGS. 3A-3H include YES and NO keys. The YES key is used to confirm a menu option (for example, designated by the cursor "> <" in the advanced dot-matrix display), entered numbers, entered characters or presented questions in the display and to originate and answer calls. The YES key thus provides the function of moving forward through the menu to the branch designated in the display, and the function of going off-hook. The NO key is used to reject the menu option, entered numbers, entered characters, or presented questions in the display and to terminate calls. If a menu option is rejected, the previous menu branch is display. The NO key thus provides the function of moving backwards through the menu to the preceding branch thereof, and the function of going on-hook. An alternative NO key, shown in FIGS. 3E and 3F, doubles as an on/off key when pressed for more than one second and there is no call in progress. The arrow keys provide the function of designating options in the menu by navigating between options in each branch. In addition, the arrow keys allow the user to scroll horizontally through a text displayed in the display.

FIGS. 6A, 6B, 7A, 7B, 8A, 8B, 9A, and 9B illustrate how the same call handling procedures can be implemented in a telephone with a uniform interface according to the present invention. The illustrated procedures are one possible set of interpretations and are meant to provide a general idea of the possibilities available with the interface according to the present invention. Additionally, the communication examples, i.e., outgoing and incoming calls, and the systems emulated are exemplary only. It is within the skill of the ordinary artisan to implement other telephone features or other emulations using the uniform interface once in possession of the instant disclosure.

Using the procedures shown in FIGS. 6–9, the user has only to press the YES or NO keys in response to the prompts displayed in the display. The user can select which mode he would like to be in, either through the use of a hardware switch (not shown) or for example, by selection of options displayed on the display. The menu allows the user to select NMT (FIGS. 6A-6B), AMPS (FIGS. 7A-7B), GSM (FIGS. 8A-8B) or other system emulation, or a system independent procedure (FIGS. 9A-9B).

FIGS. 6–9 are tables which are read in chronological order from top to bottom and left to right. FIG. 6A illustrates the emulated NMT case for setup and termination of outgoing calls as follows. In the beginning, there is an idle display. To make a call, the subscriber enters a number, which is shown in the display (as the string "012345678901" in the drawings), together with a question mark and a picture of the SEND key (receiver icon) of a NMT terminal for sending the entered number, that is, actually starting the call. Alternatively, the display may show in addition, a picture of the "S" key providing another option in the menu to store the entered number, rather than start a call. If the subscriber wants to initiate the call, he/she presses the YES key, after which the word CALL is displayed in addition to the destination telephone number. When the access is received by the land system, the number disappears and the display may show in addition that terminating the call may be achieved by pushing the NO key which in this situation, corresponds to the SEND key of an NMT terminal (receiver icon). When the NO key is pressed, the call is disconnected and the idle display is shown.

FIG. 6B illustrates the emulated NMT case for setup and termination of incoming calls as follows. In the beginning, there is an idle display. When a call is detected as incoming to the mobile terminal, the flashing word "CALL" is displayed alone, or with a picture of the SEND key (receiver icon) of a NMT terminal together with a question mark for receiving the call. If the subscriber wants to answer the call, he/she presses the YES key, after which the word CALL is displayed alone or in addition to the receiver icon followed by "=NO". The latter indicates that terminating the call may be achieved by pushing the NO key which in this situation, corresponds to the SEND key of an NMT terminal (receiver icon). When the NO key is pressed, the call is disconnected and the idle display is shown.

FIG. 7A illustrates the emulated AMPS case for setup and termination of outgoing calls as follows. In the beginning, there is an idle display. To make a call, the subscriber enters a number, which is shown in the display, together with a question mark and a picture of the SEND key of an AMPS terminal for sending the entered number, that is, actually starting the call. Alternatively, the display may show in addition, a picture of the "STO" key providing another option in the menu to store the entered number, rather than start a call. If the subscriber wants to initiate the call, he/she presses the YES key, after which the word CALL is displayed in addition to the destination telephone number. When the access is received by the land system, the number disappears and the display may show in addition that terminating the call may be achieved by pushing the NO key which in this situation, corresponds to the ON END key of an AMPS terminal. When the NO key is pressed, the call is disconnected and the idle display is shown.

FIG. 7B illustrates the emulated AMPS case for setup and termination of incoming calls as follows. In the beginning, there is an idle display. When a call is detected as incoming to the mobile terminal, the flashing word "CALL" is displayed alone, or with a picture of the SEND key of an AMPS terminal together with a question mark for receiving the call. If the subscriber wants to answer the call, he/she presses the YES key, after which the word CALL is displayed alone or in addition to the ON END key picture followed by "=NO". The latter indicates that terminating the call may be achieved by pushing the NO key which in this situation, corresponds to the ON END key of an AMPS terminal. When the NO key is pressed, the call is disconnected and the idle display is shown.

Figure 8A:
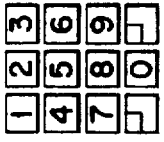
FIGS. 8A and 8B illustrate emulated GSM procedures for outgoing and incoming calls, respectively, according to an embodiment of the present invention.

FIG. 8A illustrates the emulated GSM case for setup and termination of outgoing calls as follows. In the beginning, there is an idle display. To make a call, the subscriber enters a number, which is shown in the display, together with a question mark and a picture of the SEND key of a GSM terminal for sending the entered number, that is, actually starting the call. Alternatively, the display may show in addition, a picture of the "S" key providing another option in the menu to store the entered number, rather than start a call. If the subscriber wants to initiate the call, he/she presses the YES key, after which the word CALL is displayed in addition to the destination telephone number. When the access is received by the land system, the number disappears and the display may show in addition that terminating the call may be achieved by pushing the NO key which in this situation, corresponds to the turn off/receiver key of a GSM terminal. When the NO key is pressed, the call is disconnected and the idle display is shown.

Figure 8B:
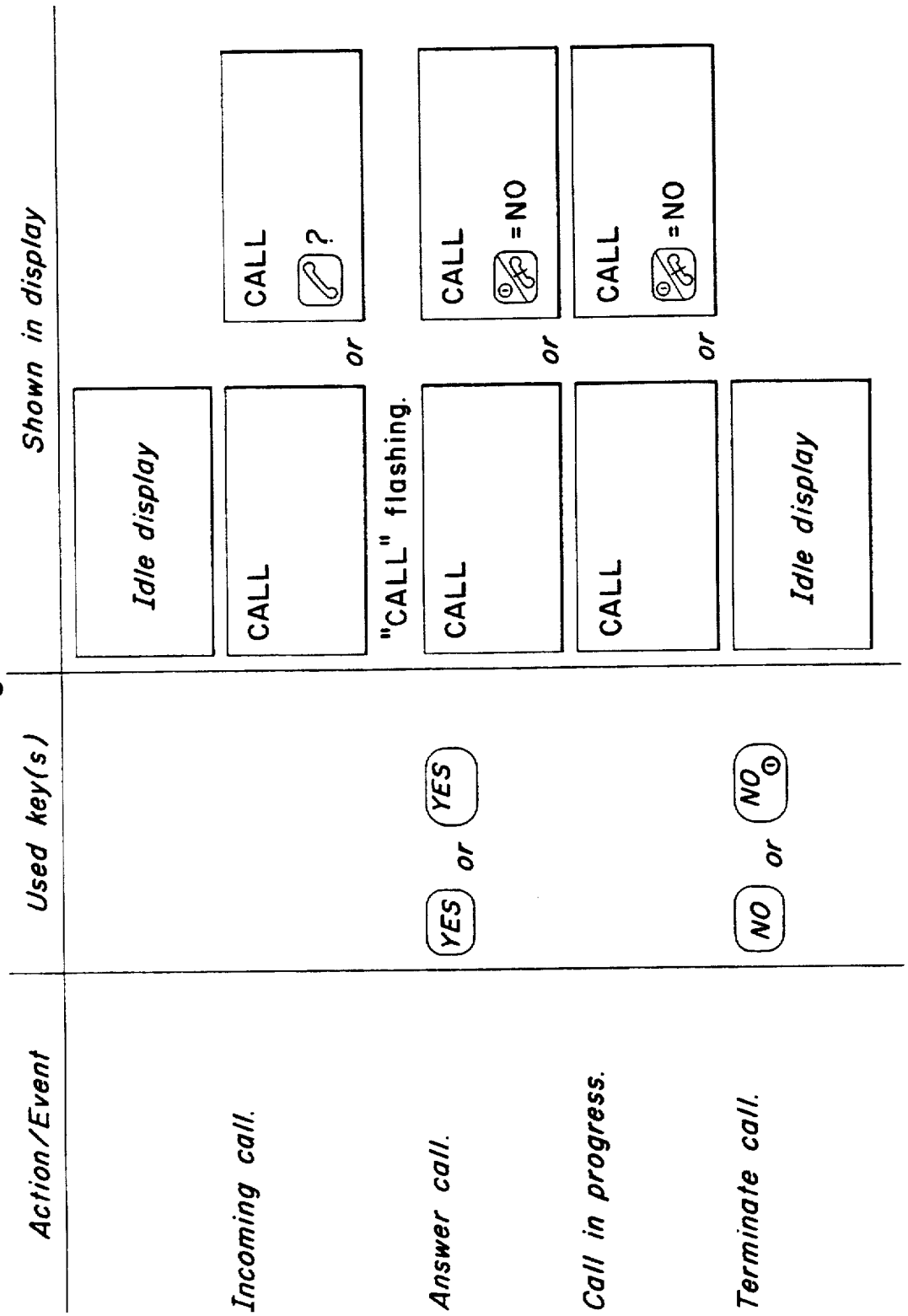

FIG. 8B illustrates the emulated GSM case for setup and termination of incoming calls as follows. In the beginning, there is an idle display. When a call is detected as incoming to the mobile terminal, the flashing word "CALL" is displayed alone, or with a picture of the SEND key (receiver icon) of a GSM terminal together with a question mark for receiving the call. If the subscriber wants to answer the call, he/she presses the YES key, after which the word CALL is displayed alone or in addition to the turn off/receiver key picture followed by "=NO". The latter indicates that terminating the call may be achieved by pushing the NO key which in this situation, corresponds to the turn off/receiver key of a GSM terminal. When the NO key is pressed, the call is disconnected and the idle display is shown.

FIG. 9A illustrates the emulated uniform implementation for setup and termination of outgoing calls as follows. In the beginning, there is an idle display. To make a call, the subscriber enters a number, which is shown in the display, together with text "Enter number to call:". If the subscriber wants to initiate the call, he/she presses the YES key, after which the word CALLING is displayed in addition to the destination telephone number. When the access is received by the land system, the display may show the text "Conversation" and the entered number. When the NO key is pressed, the call is disconnected and the idle display is shown.

FIG. 9B illustrates the emulated uniform implementation for setup and termination of incoming calls as follows. In the beginning, there is an idle display. When a call is detected as incoming to the mobile terminal, the word "INCOMING CALL" with an "ANSWER" option and a question mark is displayed alone, or with a transfer option to transfer the call. If the subscriber wants to answer the call, he/she presses the YES key, after which the word "Conversation" is displayed. When the NO key is pressed at this point, the call is disconnected and the idle display is shown. If the user wants to reject the call, he/she presses the NO key when the answer option is presented.

FIGS. 10A–10D illustrate alternative embodiments of the YES/NO keys for NMT and GSM systems according to the present invention. FIGS. 11A–11B illustrate alternative embodiments of the YES/NO keys for AMPS systems according to the present invention. Using these alternatives, the user can be made to feel more at home with the keypad of the mobile telephone including the uniform interface according to the present invention, regardless of the system to which he had become accustomed.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A mobile radio terminal comprising:
an output means for outputting at least one menu, said at least one menu comprising at least one branch for processing telephone calls, each of said at least one branches comprising at least one option for choosing a corresponding action to be performed by said radio terminal, the corresponding actions including causing a successive branch to be displayed and performing a terminal function;

selection means for designating one of said at least one options;

a first key for confirming selection of said one of said at least one options designated by said selection means, thereby moving forward through said menu to a succeeding branch of said at least one branches and performing the corresponding action chosen by the confirmed option, and for originating and answering telephone calls; and a second key for rejecting selection of said one of said at least one options designated by said selection means, thereby moving backward through said menu to a preceding branch of said at least one branches, and for terminating telephone calls, said first key and said second key being located in a position on said radio terminal that is independent of a location of said output means on said radio terminal.

2. The terminal of claim 1, further comprising at least one navigation key for moving said selection means between branches in said menu.

3. The terminal of claim 2, wherein said navigation key comprises at least one arrow key for moving between options output in said output means.

4. The terminal of claim 1, wherein said selection means comprises a cursor and wherein a plurality of options in said at least one branch are displayed on a single screen in said output means, and further comprising at least one navigation key for moving said cursor between options in the displayed branch.

5. The terminal of claim 1, wherein said first key comprises a yes key and said second key comprises a no key.

6. The terminal of claim 1, wherein said output means comprises a display.

7. A mobile radio terminal comprising:

means for emulating call handling procedures provided by a plurality of different air-interface signalling standards;

an output means for outputting a plurality of menus, each having at least one option for processing telephone calls according to one of said plurality of air-interface signalling standards;

user input means for selecting one of said plurality of menus to be output at any given time;

selection means for designating one of said at least one option in the output menu;

a first key for confirming selection of said one of said at least one options designated by said selection means, thereby moving forward through said menu, and for originating and answering telephone calls;

a second key for rejecting selection of said one of said at least one options designated by said selection means thereby moving backward through said menu and for terminating telephone calls; and at least one navigation key for moving said selection means between options in said menu, said first key and said second key being located in a position on said radio terminal that is independent of a location of said output means on said radio terminal.

8. The terminal of claim 7, wherein said at least one navigation key comprises at least one arrow key for scrolling in said output means.

9. The terminal of claim 7, wherein said first key comprises a yes key and said second key comprises a no key.

10. The terminal of claim 7, wherein said output means comprises a display.

11. The terminal of claim 7, wherein said selection means comprises at least one arrow key for navigating between options in said menu and said user input means comprises key means for turning on and off the terminal, said key means comprising said second means.

12. A dual-mode mobile radio terminal comprising:

at least two hardware component means for implementing at least two different air-interface standards;

means for selecting one of said at least two hardware component means for use at a given time;

means for emulating call handling procedures for a plurality of different air-interface signalling standards;

an output means for outputting a plurality of menus, each having at least one option for processing telephone calls according to one of said plurality of air-interface signalling standards;

user input means for selecting, independently of the selection of one of said at least two hardware components, one of said plurality of menus to be output at any given time, said user input means comprising a twelve-key alpha-numeric keypad and selection means for designating one of said at least one option in the output menu;

a first key for confirming selection of said one of said at least one options designated by said selection means, thereby moving forward through said menu, and for originating and answering telephone calls; and a second key for rejecting selection of said one of said at least one options designated by said selection means thereby moving backward through said menu and for terminating telephone calls, said first key and said second key being located in a position on said radio terminal that is independent of a location of said output means on said radio terminal.

13. The terminal of claim 12, wherein said selection means comprises at least one arrow key for navigating between options in said menu and said user input means comprises key means for turning on and off the terminal, said key means comprising said second key.

* * * * *